(12) United States Patent
Fischer

(10) Patent No.: US 6,418,855 B1
(45) Date of Patent: Jul. 16, 2002

(54) INDUSTRIAL TRUCK

(75) Inventor: Dirk Fischer, Aschaffenburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/622,269

(22) PCT Filed: Dec. 9, 1999

(86) PCT No.: PCT/EP99/09692

§ 371 (c)(1),
(2), (4) Date: Oct. 16, 2000

(87) PCT Pub. No.: WO00/35734

PCT Pub. Date: Jun. 22, 2000

(30) Foreign Application Priority Data

Dec. 15, 1998 (DE) .......................... 198 57 839

(51) Int. Cl.⁷ .............................. B61B 12/00
(52) U.S. Cl. ................... 104/118; 104/119; 104/120; 104/243; 104/245; 104/288; 105/30; 191/14
(58) Field of Search .................. 104/118, 119, 104/120, 124, 242, 243, 245, 249, 252, 251, 288; 105/30; 191/22 R, 29 R, 22 C, 14–21; 238/10 R, 10 A, 10 F

(56) References Cited

U.S. PATENT DOCUMENTS 3,533,356 A * 10/1970 Toutoundjis ................ 104/148
3,710,524 A * 1/1973 Seiz ............................ 104/247
3,807,312 A * 4/1974 Flodell ........................ 104/147
3,948,187 A * 4/1976 Moore ........................ 104/250
4,892,980 A * 1/1990 Riley ........................... 191/14

FOREIGN PATENT DOCUMENTS

| AT | 365526 | 1/1982 |
| DE | 2204759 | 8/1973 |
| DE | 2219142 | 10/1973 |
| DE | 3535207 | 4/1986 |
| DE | 9209036 | 9/1992 |
| DE | 19708390 | 9/1998 |
| EP | 0542141 | 5/1993 |

* cited by examiner

*Primary Examiner*—Mark T. Le
(74) *Attorney, Agent, or Firm*—Martin A. Farber

(57) ABSTRACT

An industrial truck (1) is driven by a friction drive (7) acting on a rail (6). For this purpose, the industrial truck (1) stands on the underlying surface by way of a front steering-roller pair (3) and a rear fixed-roller pair (5) and is kept on track by a guide roller (9) butting against the rail (6). In the region of a curved element (12), the rail (6) has an elevation, with result that there is an increase there in the propulsion force which can be transmitted by a friction wheel (8) of the friction drive (7). An introduction aid (11) allows the guide roller (9) to be aligned without difficulty in relation to the rail (6). The industrial truck (1), rather than being bound to fixed cyclic operation by its friction drive (7), can be specifically accelerated or decelerated. In the event of malfunctioning of the industrial truck (1), the latter can easily be moved manually.

7 Claims, 2 Drawing Sheets

INDUSTRIAL TRUCK

FIELD AND BACKGROUND OF THE INVENTION

The invention relates to an industrial truck which is designed, in particular, for use in a production line and can be moved by means of a drive, the movement direction of the truck being determined by a guide element.

Industrial trucks of the type mentioned serve for interlinking individual production stations and are imperative, in particular, in automated production systems. In this case, the driving takes place externally by means of a cable or chain pull which is positioned in the underlying surface of the production installation and is arranged such that it can be moved in a slot-like guide element. The industrial truck, which runs on wheels, is connected to the drive by a drawing means which extends into the slot-like guide element. In this case, the cable or chain pull is mostly designed to circulate. Following a full cycle, the industrial truck is disengaged or transferred to a further conveying means. The disadvantage with an industrial truck of the type mentioned is that the guide element has to be positioned in a sunken manner in the underlying surface or the entire production installation has to be arranged in an elevated manner on a platform, in order reliably to eliminate any risk of injury and obstruction of the production process. This involves considerable outlay, and, in addition, flexible adaptation to a different production sequence is only possible with an unreasonably high level of outlay, if at all.

It is also disadvantageous that the individual industrial trucks can only be moved synchronously by the common drive, with result that it is necessary to keep to a standard cycle time. Removal of an individual industrial truck for reworking or in the event of malfunctioning is only possible at diverters or removal stations provided specifically for this purpose. In addition, malfunctioning of the drive affects all the industrial trucks connected up, with result that it is always a number of stations or an entire production line that is affected by the malfunctioning. In addition to the associated risk during failure of the installation, this also produces, at the same time, considerable outlay in terms of the production control.

Furthermore, the drive of such an industrial truck is comparatively susceptible to malfunctioning since particles of dirt accumulate in the depression in the underlying surface and the drive may thus be blocked.

SUMMARY OF THE INVENTION

The invention is based on the problem of configuring an industrial truck of the type mentioned in the introduction such that there is a reduction in outlay during use of such an industrial truck and in the event of changes to the route and, at the same time, there is an increase in the operational reliability.

This problem is solved according to the invention in that the drive is a friction drive which is arranged on the industrial truck, on the one hand the friction drive being supported on the industrial truck and, on the other hand, the friction wheel of the friction drive rolling on the underlying surface or on an element fixed thereto. This makes it possible for a number of industrial trucks to be operated at independent speeds because each industrial truck has a separate drive. Consequently, malfunctioning of the drive merely affects a single industrial truck, with result that it is not possible to obstruct further production stations or the production line as a whole. At the same time, the design of the drive as a friction drive allows the industrial truck to be exchanged easily without a specific diverter or removal station being necessary for this purpose. Since a friction drive produces merely a limited propulsion force, the risk of individuals being involved in accidents is largely ruled out. After striking an obstruction, the industrial truck merely remains at a standstill, the friction wheel spinning, and can then also be accelerated manually in order to compensate for any time losses occurring, for example, as a result. The industrial truck can be moved on wheels or rollers but also on sliding elements.

The guide element could be a colored guide line on the ground, it being possible for said guide line to be sensed by means of optical sensors, an induction line or else a camera with a corresponding control means. On the other hand, a development of the invention in which the guide element is a rail on which the friction drive acts by way of the friction wheel is particularly advantageous. This easily makes it possible to achieve reliable guidance of the industrial truck. In this case, the friction pairing of the friction wheel and the rail may be optimally adapted to the respective use purpose, with the result that it is also possible to overcome upward or downward slopes without difficulty. For this purpose, the friction wheel can butt against the rail, for example, laterally or from above. For better guidance, the friction drive may be provided with a further friction wheel, with result that the two friction wheels butt from opposite sides against the rail or against two parallel lateral boundary surfaces. In this case, and for the purpose of avoiding injury, the rail does not have any sharp edges or protrusions and, in addition, has a conspicuous coloring.

A particularly advantageous development of the invention is provided when the friction wheel is prestressed in relation to the rail by means of an adjustable spring element. As a result, the desired propulsion can be optimally adjusted to the respective circumstances. In particular, it is thus possible to take account of alternating load states and to limit the maximum propulsion force, with result that an immediate standstill is achieved when an obstruction is struck. Furthermore, it is also possible to compensate for unevennesses of the guide element and wear-induced abrasion on the friction wheel.

Particularly expedient here is a configuration of the invention in which the rail is arranged such that it projects from the underlying surface. This makes it possible to achieve flexible adaptation of the rail routing to different production processes without specific structural changes, in particular the provision of a depression in the underlying surface, being necessary for this purpose.

A particularly expedient modification of the invention is also provided when the rail has an introduction aid for the friction wheel. This makes it possible to provide individual route sections in which the rail is interrupted and the industrial truck can thus be displaced manually as desired. Individual production stations may thus be disengaged from the cyclic operation. The friction wheel of the industrial truck can then be introduced without difficulty into the rail by means of the, for example, wedge-shaped introduction aid and engagement of the friction wheel in the rail can thus be resumed.

It is also particularly expedient if the rail has a stop element which can be actuated manually. This makes it possible for the industrial truck to stop without difficulty at a desired location in order thus to allow convenient processing of the components conveyed on the industrial truck. For this purpose, for example, it is possible to discontinue the engagement of the friction wheel in the rail or else the supply of energy to the drive. Furthermore, it is also possible to have straightforward stop elements in the case of which the industrial truck merely strikes against the stop element and increased slippage thus occurs on the friction wheel.

A particularly straightforward configuration of desired rail routing is achieved in that the rail is made up of individual elements. Elements preformed in this way may thus easily be assembled to form a desired route. By virtue of such a modular construction principle, it is easily possible to realize a different route or subsequent extensions which, depending on the route, only require a small number of fixing means, if any at all. If there is any wear or damage, the relevant elements may quickly be exchanged, with result that the production process is only limited to a slight extent.

Particularly useful, in addition, is an embodiment of the invention in which, in different sections, the rail has different dimensions, this being associated with in each case different prestressing of the friction wheel in relation to the rail. Different propulsion forces can be achieved by the associated, different contact-pressure force of the friction wheel against the rail. In particular, it is thus possible for curves or upward slopes to be overcome without difficulty by, for example, a rail elevation which acts on the friction wheel being provided there. These sections may additionally have a different friction pairing in order thus additionally to improve the force transmission.

It is also particularly expedient if the rail is formed as a hollow profile or an essentially downwardly open profile. Supply lines for the supply of electrical energy to the friction drive may thus easily be arranged in the interior of the profile and thus protected against damage. When individual rail elements are used, the electrical contact can also take place at the same time as the individual elements are joined together, and thus without difficulty or error. Furthermore, the rail may also serve as a cable duct for supply lines of other electrical loads.

The industrial truck could carry along its own supply of electrical energy. On the other hand, an embodiment of the invention in which the rail has two contact surfaces which are insulated electrically in relation to one other and against which the respectively one current collector of the friction drive butts is particularly advantageous. This makes it possible to eliminate the weight for a dedicated energy supply and to use more powerful friction drives. At the same time, it is also possible to use the contact surfaces to transmit control signals, in particular for changes in speed.

Particularly favorable for this purpose is a development of the invention in which the elements of the rail can be activated individually. In this way, it is possible for individual route sections and the industrial truck located in this route section to be stopped without difficulty or for the speed thereof to be changed. It is thus also possible for individual elements to be assigned different propulsion speeds, in order thus to be able to run through long transporting paths more quickly.

The movement direction can be imposed on the industrial truck by means of the friction wheel. On the other hand, a development of the invention is particularly well-suited where the industrial truck additionally has a guide roller which butts against the rail. This means that the steering function can be fulfilled exclusively by said guide roller but the drive function, in contrast, can be fulfilled by the friction wheel. In this case, the wear can be reduced by suitable coordination. At the same time, changes in direction sensed by the guide roller can be transmitted to the wheels of the industrial truck, so that a corresponding steering movement can be initiated, as a result of which the truck can run through particularly small curved radii.

Another particularly advantageous embodiment of the invention is provided when the friction drive engages in at least one roller or one wheel of the industrial truck. As a result, the force of the friction drive is transmitted directly to one wheel, with result that the guide element merely establishes the movement direction. The guide element may thus be of a very flat design, with the result that it does not constitute any obstruction for individuals or other vehicles. Furthermore, it may be flexible and may thus reduce the risk of accidents. It is also conceivable to have industrial trucks in which a friction wheel rests directly on the underlying surface and is thus designed for example, at the same time, as the drive wheel.

BRIEF DESCRIPTION OF THE DRAWINGS

The invention allows various embodiments. In order to elucidate its basic principle further, one of these is described herein below and illustrated in the figures of the drawings, in which, in a perspective and partially sectional illustration.

DETAILED DESCRIPTION OF THE PREFERRED EMBODIMENT

Figure 1:
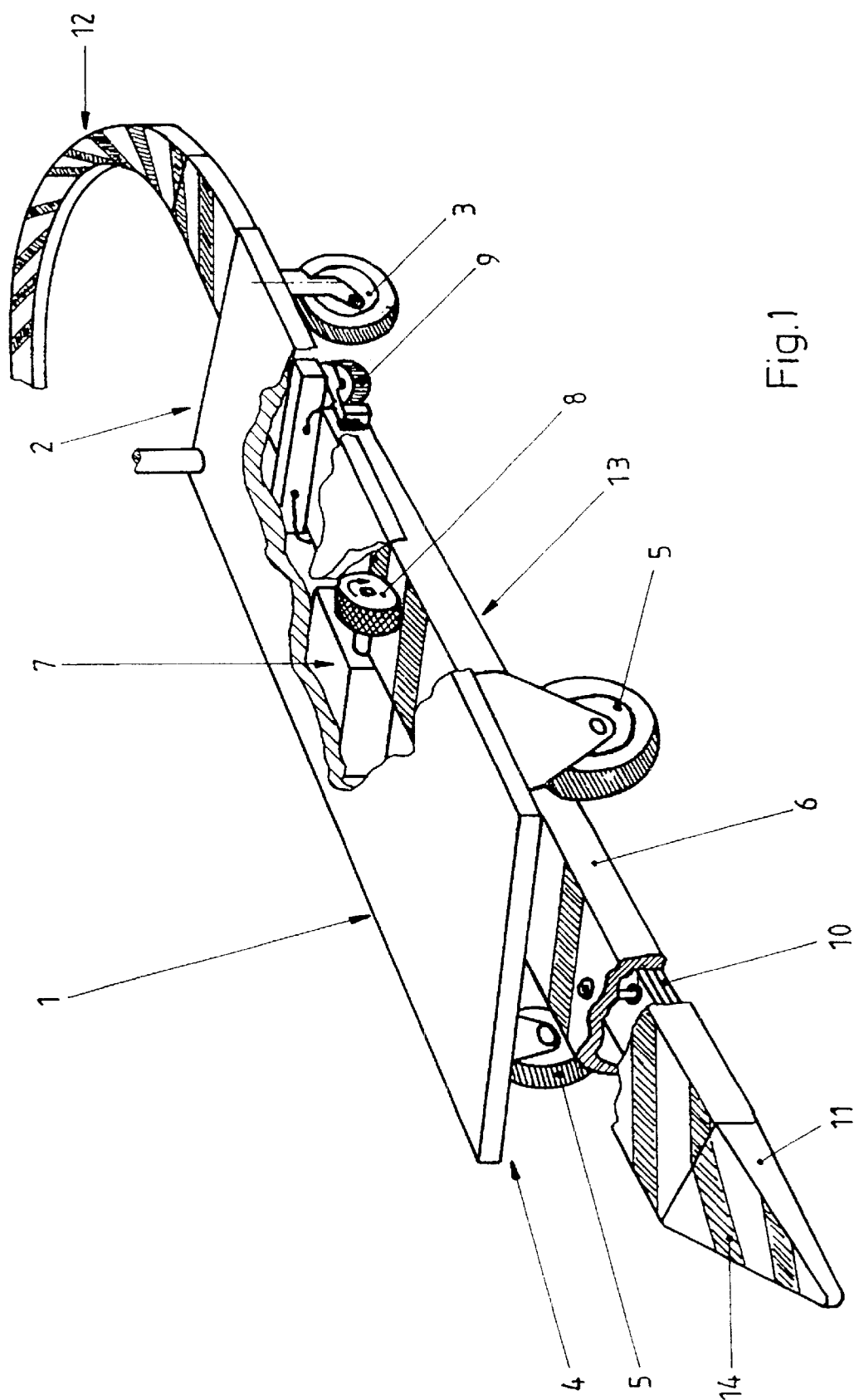
FIG. 1 shows an industrial truck according to the invention with a rail, of which certain sections are illustrated.

FIG. 1 shows a perspective view of an industrial truck 1 according to the invention. As seen in the direction of travel, the industrial truck 1 has a steering-roller pair 3 on its front side 2 and a fixed-roller pair 5 on its rear side 4. The steering-roller pair 3 and the fixed-roller pair 5 each enclose a guide element which runs approximately parallel to the longitudinal axis of the vehicle and is designed as a rail 6. The industrial truck 1 has a friction drive 7 with a friction wheel 8 which is prestressed against the rail 6 from above by means of a spring element (not illustrated). The industrial truck 1 also has a guide-roller pair which is arranged in its front section, butts against the rail 6 from the outside and of which one guide roller 9 can be seen. By means of said guide roller 9, the industrial truck 1 is provided with its movement direction determined by the rail 6. The rail 6 is designed with a downwardly open U-profile, in the interior of which a number of supply lines 10 run. A wedge-shaped introduction aid 11 allows the industrial truck 1 to be aligned manually without difficulty on the rail 6 until, finally, the friction wheel 8 butts against the rail 6 and ensures propulsion. In the region of a curved element 12 of the rail 6, the surface of the rail 6 is elevated in relation to a rectilinear element 13 of the rail 6, with result that, in this region, there is also an increase in the prestressing force of the friction wheel 8 and thus in the propulsion force which can be transmitted. In order to reduce the possible risk of an accident, the rail 6 has a conspicuous coloring, which is illustrated here by way of example by oblique stripes 14.

Figure 2:
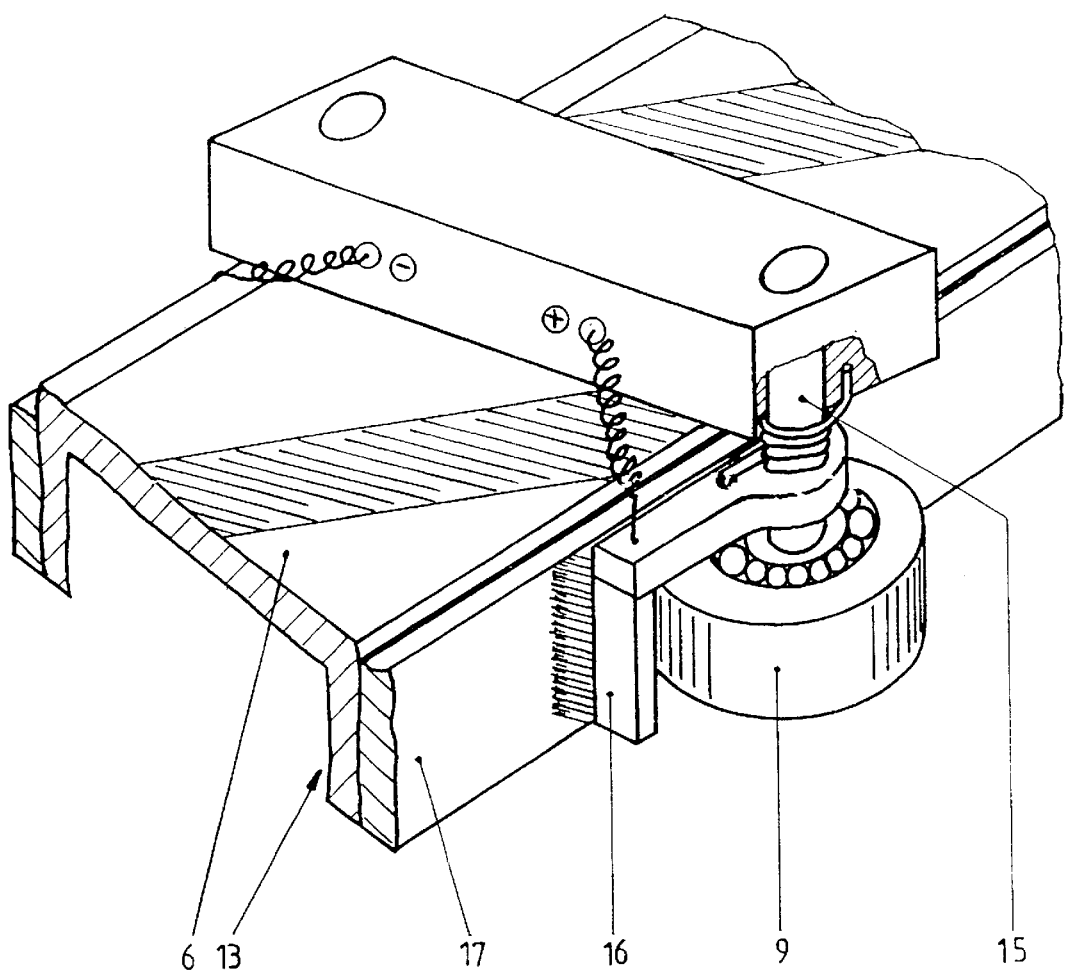
FIG. 2 shows an enlarged illustration of a guide unit of the industrial truck illustrated in FIG. 1.

FIG. 2 shows a perspective illustration of the guide roller 9 of the industrial truck 1 illustrated in FIG. 1. It is possible to see a current collector 16 which is mounted such that it can be pivoted about an axis of rotation 15 of the guide roller 9. The current collector 16 butts against an electrical contact surface 17 which is designed as a contact rail and is arranged in each case on a side surface of the rail 6. A change in speed or standstill of the industrial truck may thus be achieved by a change in the frequency of the respective element 13 of the rail 6. At the same time, comparatively large quantities of energy can be transmitted, it being possible for the electrical contact surface 17 and individual elements 13 of the rail 6 to be exchanged without difficulty. In this case, the propulsion force does not exceed a magnitude which is dangerous for individuals, with the result that it is possible for the risk of injury to be ruled out and for the industrial truck to be stopped manually in any position. A second guide roller—concealed by the rail 6 in FIG. 2—with a further current collector is arranged on that side of the rail 6 which is opposite the guide roller 9 illustrated.

I claim:

1. An industrial truck and a guide for said industrial truck, which is adaptable to move on wheels, rollers or sliding elements, and which is, in particular, for use in a production line and movable by an electronic drive, a movement direction of the truck being determined by a guide element, wherein the drive is a friction drive (7) which is arranged on the industrial truck (1), on one hand the friction drive being supported on the industrial truck (1) and, on the other hand, a friction wheel (8) of the friction drive rolling on an underlying surface of the guide element or on an element fixed thereto, wherein said guide element is a rail, wherein the rail (6) is made of individual elements (12, 13), wherein the individual elements (12,13) are configured for supplying electrical energy for the drive, wherein the individual elements (12,13) of the rail (6) are configured to be individually activated for controlling the truck, wherein each said individual element of the rail (6) has two contact surfaces (17) which are insulated electrically with respect to one another, and a current collector (16) of the drive butts against each said contact surface, and wherein the rail (6) has a wedge shaped introduction aid (11) for the friction wheel to manually align the industrial truck (1) on the rail (6).

2. The industrial truck as claimed in claim 1, wherein the friction wheel (8) is adapted to be prestressed with respect to the rail.

3. The industrial truck as claimed in claim 1, wherein the rail (6) includes said two contact surfaces projecting from said underlying surface.

4. The industrial truck as claimed in claim 2, wherein, in different sections, the rail (6) has different dimensions which are associated respectively with different prestressing of the friction wheel (8) with respect to the rail (6).

5. The industrial truck as claimed in claim 1, wherein the rail (6) is a hollow profile or an essentially downwardly open profile.

6. The industrial truck as claimed in claim 1, wherein the industrial truck (1) additionally has a guide roller (9) which butts against the rail (6).

7. The industrial truck as claimed in claim 1, wherein the friction wheel (8) comprises at least one roller on the industrial truck.

\* \* \* \* \*